(12) United States Patent
Schmookler et al.

(10) Patent No.: US 6,240,433 B1
(45) Date of Patent: May 29, 2001

(54) HIGH ACCURACY ESTIMATES OF ELEMENTARY FUNCTIONS

(75) Inventors: Martin Stanley Schmookler; Donald Norman Senzig, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,801

(22) Filed: Mar. 21, 2000

Related U.S. Application Data

(62) Division of application No. 09/017,233, filed on Feb. 2, 1998, now Pat. No. 6,163,791.

(51) Int. Cl.$^7$ ....................................... G06F 1/02
(52) U.S. Cl. .............................................. 708/270
(58) Field of Search ............................ 708/270, 272–277

(56) References Cited

U.S. PATENT DOCUMENTS

| | | | |
|---|---|---|---|
| 4,482,975 | * 11/1984 | Kino et al. | 708/272 |
| 5,570,310 | * 10/1996 | Smith | 708/277 |
| 5,862,059 | * 1/1999 | Matula et al. | 708/270 |
| 5,963,460 | * 10/1999 | Rarick | 708/270 |

\* cited by examiner

*Primary Examiner*—Tan V. Mai
(74) *Attorney, Agent, or Firm*—Anthony V.S. England; Bracewell & Patterson L.L.P.

(57) ABSTRACT

An improved method of estimating the square root, reciprocal square root, and reciprocal of an input value in a computer system. The input value, after being normalized, is used to select a pair of constants from a table. The constants are based on a linear approximation of the function for each interval of the input value, offset to reduce a maximum error value for a given interval. The estimated function is calculated by adding or subtracting the product of a part of the normalized input value and the first constant from the second constant. In one implementation, the input value is normalized within the range $1 \leq x < 2$, and one lookup table is used, having an interval size of $\frac{1}{32}$. In a further preferred embodiment, only a lower order part of the mantissa is used in the multiply-add operation, to reduce the number of bits required (the high order part of the mantissa is used to select the constants from the table). In another implementation, the input value is normalized within the range $0.5 \leq x < 2$, and two lookup tables are used, a first table having an interval size of $\frac{1}{32}$ for the range $0.5 \leq x < 1$, and a second table having an interval size of $\frac{1}{16}$ for the range $1 \leq x < 2$.

2 Claims, 4 Drawing Sheets

HIGH ACCURACY ESTIMATES OF ELEMENTARY FUNCTIONS

This is a Division of application Ser. No. 09/017,233, filed Feb. 2, 1998, U.S. Pat. No. 6,163,791.

BACKGROUND OF THE INVENTION

1. Field of the Invention

The present invention generally relates to computer systems, and more particularly to a computer system providing an improved method for generating high precision estimates of the square root, reciprocal square root, and reciprocal functions.

2. Description of the Related Art

A computer processor can perform arithmetic operations on different types of numbers, or operands. For example, the simplest operations involve integer operands, which are represented using a "fixed-point" notation. Non-integers are typically represented according to a "floating-point" notation. In conventional computers, a "single-precision" floating-point number is represented using a 32-bit (one word) field, and a "double-precision" floating-point number is represented using a 64-bit (two-word) field.

Floating-point notation (which is also referred to as exponential notation), can be used to represent both very large and very small numbers. A floating-point notation has three parts, a mantissa (or significant), an exponent, and a sign (positive or negative). The mantissa specifies the digits of the number, and the exponent specifies the magnitude of the number, i.e., the power of the base which is to be multiplied with the mantissa to generate the number. For example, using base 10, the number 28330000 would be represented as 2833E+4 (a mantissa of 2833 and an exponent of 4), and the number 0.054565 would be represented as 54565E-6 (a mantissa of 54565 and an exponent of -6). Since processors use binary values in their computations, floating-point numbers in most computers use 2 as a base (radix). Thus, a floating-point number may generally be expressed in binary terms according to the form $$n = (-1)^S \cdot 1.F \cdot 2^E,$$

where n is the floating-point number (in base 10), S is the sign of the number (0 for positive or 1 for negative), F is the fractional component of the mantissa (in base 2), and E is the exponent of the radix. In accordance with the Institute of Electrical and Electronics Engineers (IEEE) standard 754, a single-precision floating-point number uses the 32 bits as follows: the first bit indicates the sign (S), the next eight bits indicate the exponent offset by a bias amount of 127 (E+bias), and the last 23 bits indicate the fraction (F). So, for example, the decimal number ten would be represented by the 32-bit value 0 10000010 01000000000000000000000 as this corresponds to $(-1)^0 \cdot 1.01_2 \cdot 2^{130-127} = 1.25 \cdot 2^3 = 10$.

Many processors handle floating-point operations with a floating-point unit (FPU). Floating-point processing is used in addition, multiplication and division operations, and may also be used for other special mathematical functions, such as the square root ($\sqrt{x}$), reciprocal square root ($1/\sqrt{x}$), and reciprocal ($1/x$) functions. Many conventional processors use iterative approximation algorithms to determine these values, such as Newton-Raphson iteration. To understand this particular algorithm, it is helpful to first understand Newton's iteration for zero finding, which is also used for division operations, and is illustrated in FIG. 1. A generalized curve is represented by the function f(x), and it is desired to know the zero of this function (i.e., the value of the x-intercept). Basically, the function is approximated by its tangent at an arbitrary location ($x_0$) corresponding to an initial guess, and a new guess is then formulated based on the zero ($x_1$) of this tangent line. This simple procedure can then be repeated as many times as is required to achieve a desired precision. It can be shown that, generally, the zero of a tangent line corresponding to a given iteration i is given by the equation $$x_{i+1} = x_i - \frac{f(x_i)}{f'(x_i)}. \quad \text{(equ. 1)}$$

The reciprocal operation can be cast as a zero finding operation by considering the function $f(x)=1/x-r$. Since the zero of this function is at $1/r$, Newton's iteration can be used to calculate the reciprocal function. It can be shown that, for the reciprocal function, equation 1 becomes $$x_{i+1} = x_i(2-x_i r). \quad \text{(equ. 2)}$$

This equation is commonly used for division. An initial value for $x_0$ is provided by a table lookup. Several iterations of equ. 2 are used to obtain the reciprocal of the divisor which corresponds to r. The reciprocal value is then multiplied by the dividend to obtain the quotient.

To compute a square root, a similar iterative process can be performed, and it can be shown that the square root can be computed according to the equation $$x_{i+1} = 0.5(x_i + r/x_i). \quad \text{(equ. 3)}$$

However, equ. 3 requires a divide operation for $r/x_i$, which is much slower than a multiply operation. Instead, the Newton-Raphson iterations for computing the reciprocal square root is often used, which is:

$$x_{i+1} = 0.5x_i(3-x_i^2 r). \quad \text{(equ. 4)}$$

Several iterations are used to obtain a more precise estimate of the reciprocal square root of r. This value may then be multiplied by r to obtain the square root of r, as shown below:

$$\sqrt{r} = r(1/\sqrt{r}).$$

Newton-Raphson converges quadratically so each iteration approximately doubles the number of correct digits. A table lookup is again used to start the procedure, avoiding the first few iterations and improving performance. To generate four correct bits via table lookup requires an 8-entry table. Each additional bit required doubles the number of table entries.

Newton-Raphson iterative algorithms are used in many cases since they are often faster than other algorithms. Nevertheless, iterative algorithms may present other problems. For example, rounding errors can be introduced, and for division operations, it provides no remainder. Furthermore, iterative algorithms still have performance limitations. Depending upon the precision required, the complete iterative process can take a considerable number of processor cycles. The corresponding delay may affect some procedures, particularly those involving multimedia presentations. Some multimedia extensions to processor architectures also specify reciprocal and reciprocal square root instructions that require increased (12-bit) precision. To generate 12 correct bits using conventional table lookup techniques requires a table of 2048 entries, which introduces more hardware costs. One alternative is to use a 64 entry table and one Newton-Raphson iteration which requires at least two multiply operations, as indicated by equation 2 (for the reciprocal), or requires at least three multiply operations, as indicated by equation 4 (for the reciprocal square root).

Another alternative involves the use of a linear approximation. See, e.g., U.S. Pat. No. 5,563,818, and "Efficient Initial Approximation and Fast Converging Methods for Division and Square Root," Proceedings 12th Symposium on Computer Arithmetic, pp. 2–9 (1995). However, these implementations require larger lookup tables and larger multipliers than the implementation that will be described. A system that performs a quadratic approximation is shown in U.S. Pat. No. 5,245,564. This technique is an extension of linear approximation, providing three times the precision of a table lookup for the same number of words at the cost of an additional multiply and add, but accordingly requiring a longer execution time.

In light of the foregoing, it would be desirable to devise an improved method of estimating square roots, reciprocal square roots, and reciprocals with high precision to reduce the number of iterations. It would further be advantageous if the method could reduce both the size and the delay of the multiplier to achieve higher precision without increasing the time required to compute the reciprocal or reciprocal square root.

SUMMARY OF THE INVENTION

It is therefore one object of the present invention to provide a method for computing the square root, reciprocal square root, and reciprocal of a number in a processor of a computer system.

It is another object of the present invention to provide such a method resulting in high precision estimates, but without requiring numerous iterative steps.

It is yet another object of the present invention to provide such a method which also does not require a significant increase in hardware (i.e., uses smaller lookup tables).

The foregoing objects are achieved in a first implementation of the invention adapted to provide a reciprocal of an input value in a computer system having a processor, generally comprising the steps of normalizing the input value, selecting a first constant and a second constant from a table based on the normalized input value, wherein the first and second constants are based on a linear approximation of the function $1/x$ using left and right edges of a given interval offset to reduce a maximum error value for the given interval, and calculating an estimated reciprocal by subtracting the product of the normalized input value and the first constant from the second constant. The normalized input value has a mantissa, and the first and second constants are selected based on the most significant bits of the mantissa. In one variation, the input value is normalized within the range $1 \leq x < 2$, and the table has an interval size of $1/32$. The first and second constants are preferably provided with sufficient precision such that the estimated reciprocal has a relative error less than $1/4096$.

In a further preferred embodiment, the second constant is a function of the values of the left and right edges of a given interval, and only a lower order part of the mantissa is used, thus reducing the number of bits required in a multiply-add operation. A significant improvement in the time required to compute the reciprocal of a number is made possible for a relatively minor increase in hardware cost.

In a second implementation of the invention adapted to provide a reciprocal square root of an input value in a computer system having a processor, the method generally comprises the similar steps of normalizing the input value, selecting a first constant and a second constant from a table based on the normalized input value, wherein the first and second constants are based on a linear approximation of the function $1/\sqrt{x}$ using left and right edges of a given interval offset to reduce a maximum error value for the given interval, and calculating an estimated reciprocal square root by subtracting the product of the normalized input value and the first constant from the second constant. In one variation of this implementation, the input value is normalized within the range $0.5 \leq x < 2$, and two lookup tables are used, a first table having an interval size of $1/32$ for the range $0.5 \leq x < 1$, and a second table having an interval size of $1/16$ for the range $1 \leq x < 2$. The first and second constants are preferably provided with sufficient precision such that the estimated reciprocal square root has a relative error less than $1/4096$. In a further preferred embodiment, the second constant is a function of the values of the left and right edges of a given interval, and only a lower order part of the mantissa is used, thus reducing the number of bits required in a multiply-add operation (the high order part of the mantissa is used to select the constants from the two tables). An estimated square root can be calculated by multiplying the normalized input value with the estimated reciprocal square root. A significant improvement in the time required to compute the reciprocal square root of a number is again made possible for a relatively minor increase in hardware cost.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 2:
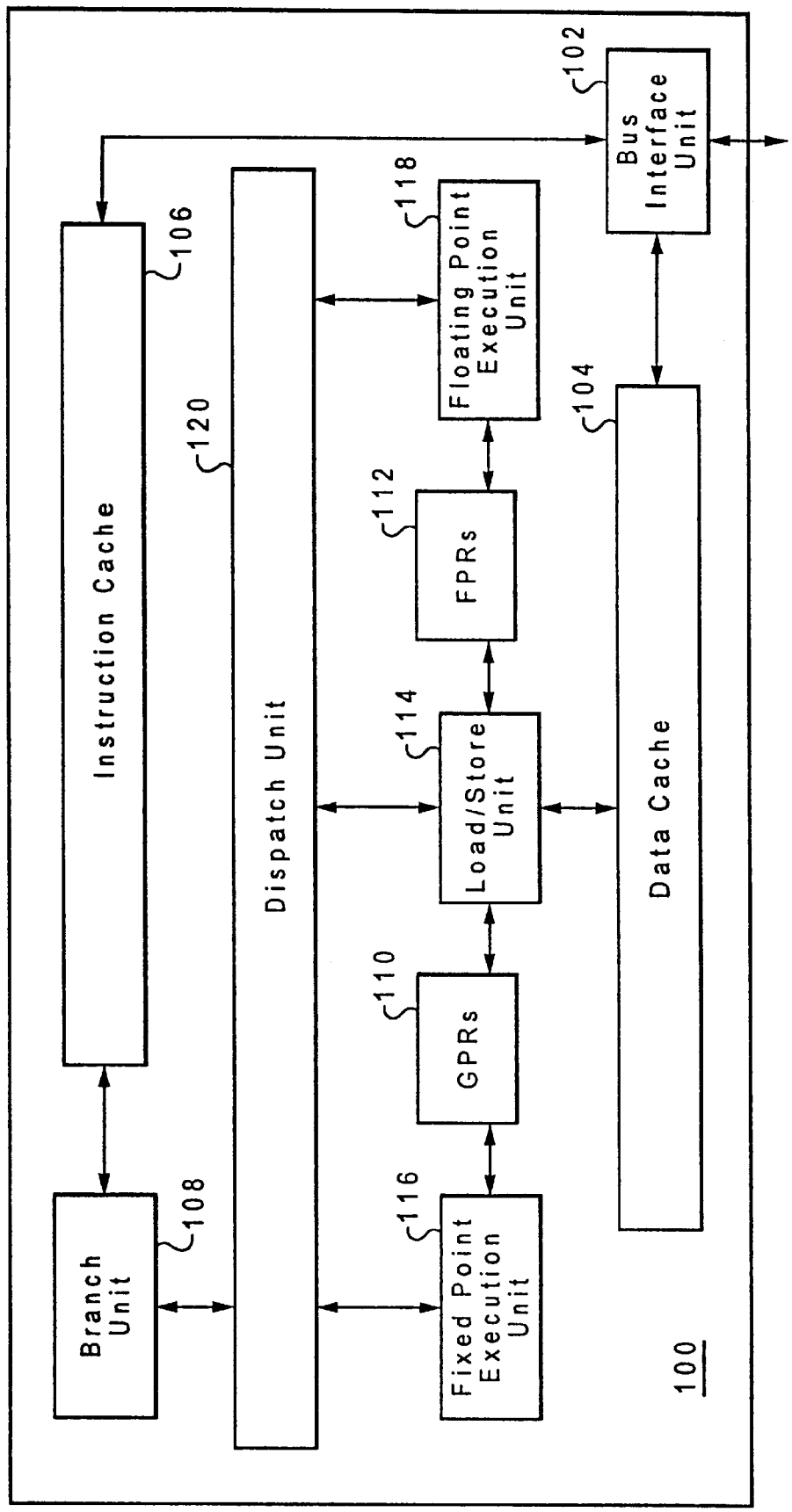
FIG. 2 is a block diagram of one embodiment of a processor in which the present invention may be implemented.

The present invention is directed to a method of determining the square root, reciprocal square root, or reciprocal of a number, performed by a processor of a computer system. With reference to FIG. 2, a block diagram of a processor in which a preferred embodiment of the present invention may be implemented is depicted. The processor may include the various components shown in FIG. 2, but the processor is not necessarily conventional, i.e., it could include new hardware components as well, or have a novel interconnection architecture for existing components. Therefore, while the present invention may be understood with reference to FIG. 2, this reference should not be construed in a limiting sense.

Processor 100 includes a bus interface unit 102 which controls the flow of data between processor 100 and the remainder of the data-processing system (not shown). Bus interface unit 102 is connected to both a data cache 104 and an instruction cache 106. Instruction cache 106 supplies instructions to branch unit 108, which determines what sequence of instructions is appropriate given the contents of general-purpose registers (GPRs) 110 and floating-point registers (FPRs) 112 in processor 100, the availability of load/store unit 114, fixed-point execution unit 116, and floating-point execution unit 118, and the nature of the instructions themselves. Branch unit 108 forwards the ordered instructions to dispatch unit 120, which issues the individual instructions to the appropriate logic unit (load/store unit 114, fixed-point execution unit 116, or floating-point execution unit 118).

Fixed-point execution unit 116 reads data from and writes data to general-purpose registers 110. Floating-point execution unit 118 reads data from and writes data to floating-point registers 112. Load/store unit 114 reads data from general-purpose registers 110, floating-point registers 112, and writes the data to data cache 104 or to an external memory (not shown) depending on the memory hierarchy and caching protocol employed by the data-processing system, which are beyond the scope of the present invention. Load/store unit 114 also reads data from data cache 104 and writes the data to general-purpose registers 110 and floating-point registers 112.

Those skilled in the art will appreciate that the details of either the construction of processor 100 or its operation may vary depending on the objectives influencing the design. For example, processor 100 may include register renaming multiple fixed-point execution units 116 for executing fixed-point instructions without data dependencies in parallel, or a memory management unit regulating the content of data cache 104 and a second level (L2) cache (not shown) outside processor 100. Floating-point execution unit 118 may be of the type which receives three input operands (A, B, and C) expressed as floating-point numbers.

Floating-point execution unit 118 uses these operands to perform a "multiply-add" instruction. The multiply-add instruction executes the arithmetic operation $\pm[(A\times C)\pm B]$. The exponent portions of operands A, B, and C are provided to an exponent calculator, and the mantissa portions of operands A and C are provided to a multiplier, while the mantissa portion of operand B is provided to an alignment shifter, which aligns operand B with the product of A and C, based on their respective exponents. The aligned operand B is then added to the A times C product.

Floating-point unit 118 may be used in accordance with a first implementation of the present invention to generate the mantissa of the reciprocal of a floating-point number. The steps from reciprocal to quotient, and handling of the floating-point exponent when computing the reciprocal, are well known and are not discussed in this disclosure. Floating-point unit 118 may also be used in accordance with a second implementation of the present invention to generate the mantissa of the reciprocal square root of a floating-point number. The square root can then be determined as well, by multiplying the reciprocal square root against the number itself.

Figure 1:
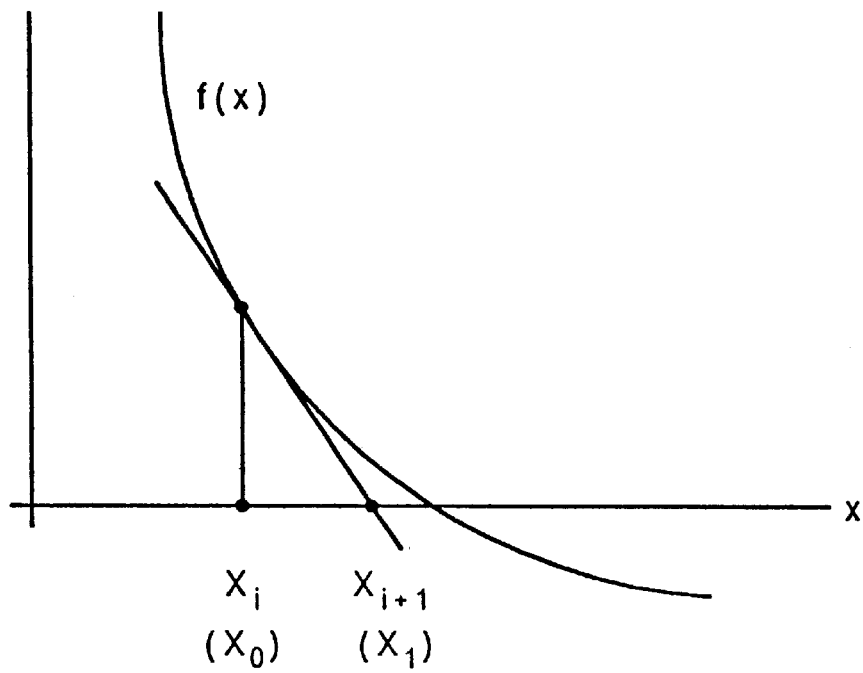
FIG. 1 is a graph illustrating Newton's method of zero finding which forms the basis of conventional iterative methods for determining a square root, reciprocal square root, or reciprocal.
Figure 3:
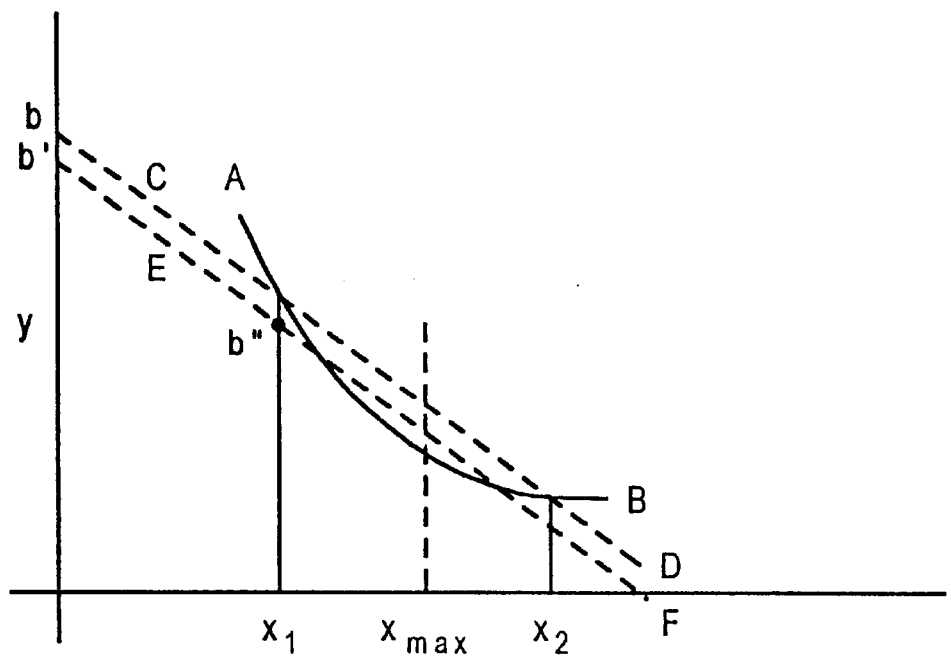
FIG. 3 is graph illustrating the method of the present invention whereby a high precision estimate of the square root, reciprocal square root, and reciprocal may be determined in a non-iterative fashion.

The method of the present invention may be understood further with reference to FIG. 3, which, according to the first implementation, may be considered as a graph of a segment of the reciprocal function $y=1/x$. It is assumed that y and x are normalized numbers, and that $1 \leq x < 2$. As stated above, it is well known how to handle the floating-point exponent, so without loss of generality only generation of the mantissa is discussed herein. In FIG. 3 the curve A-B represents a segment of the function $y=1/x$. Between the points $x_1$ and $x_2$, the line C-D approximates $1/x$. The slope, a, of line C-D is given by the equation $$a=(y_2-y_1)/(x_2-x_1)=(1/x_2-1/x_1)/(x_2-x_1)=-1/(x_2x_1)$$

The offset, b, is given by the equation $$b=y_1-ax_1$$

The maximum relative error, $y_{err}$ occurs at $x_{max}$ which can be found by differentiating $$y_{err} = \frac{ax_{max} + b - 1/x_{max}}{1/x_{max}}$$

and setting $$\frac{dy_{err}}{dx} = 0$$

$$x_{max} = 0.5(x_2 + x_1)$$

As can be seen from FIG. 3, while the worst case error occurs at $x_{max}$, the error at the end points is zero. The error can be spread over the interval and the maximum error reduced by approximately a factor of two by "sliding" the line C-D half-way down to the curve A-B at the point $x_{max}$. This puts the line in the position shown by E-F in FIG. 3. The slope of E-F remains a. The offset of E-F, b', is given by $$b'=b-0.5(ax_{max}+b-1/x_{max})$$

The method of the present invention provides a linear approximation based on the constants a and b'. An examination of the functions $1/x$ and $ax+b$ reveals that the slope, a, will always be negative. For convenience, in the development that follows a is treated as positive, and then ax is subtracted from b'.

The constants a and b' can be stored in one or more lookup tables for different intervals between the values of 1 and 2. The particular constant pair is chosen by the most significant mantissa bits of the argument x. The size of the interval is the largest power of two that permits the error criteria to be met. For a relative error less than $½^{12}$, the interval size is $1/32$ for the range $1 \leq x < 1.78125$, and is $1/16$ for the range $1.78125 \leq x < 2$. The appropriate entry in a given table is then selected by ignoring the implied bit and using the most significant j bits of the mantissa to select the appropriate constants a and b' from the stored table. If the accuracy criteria is a relative error less than $½^{12}$, j=5. Then, the estimated reciprocal y is computed as $ax+b'$.

Considering the precision requirement, truncation, and round-off errors, the computation $y=b'-ax$ implies a 15-bit multiply and add. However, the multiplication can be reduced to 10 bits by recognizing that, for the constant pair selected the first five bits of x are already known. For one particular hardware embodiment, the argument x can be partitioned into a high order part $x_H$ and a low order part $x_L$. Part $x_H$ consists of the j bits used to address the table. The product of a and $x_H$ can be pre-calculated, subtracted from b', and stored when the table is created. Thus, for each interval of x, the equation y=b'−ax can be rewritten as:

$$y=b'-a(x_H+x_L)=(b-ax_H)-ax_L b''-ax_L$$

Referring to FIG. 3, b" is the value of $y_1$ on the line E-F. The constant a used to multiply $x_L$ can have j fewer bits than b" because $x_L$ is a factor of $2^j$ smaller than b" in magnitude. In a preferred embodiment, the actual constants stored in the tables are rounded versions of a and b". The constant b" requires 15 bits to provide 12 bits of precision when considering real round-off and truncation errors. Because rounding $x_L$ would increase execution time, $x_L$ is truncated. In an exemplary implementation, the slope a is multiplied by $x_L$ where $x_L$ consists of the 9 most significant bits of x following the five fraction bits used to access the table. The constants are presented in hexadecimal form in Table 1.

TABLE 1

| Interval | Left Edge | Right Edge | Slope | Modified Offset |
|---|---|---|---|---|
| 0 | 1.00000 | 1.03125 | 000003E1 | 00007FFC |
| 1 | 1.03125 | 1.06250 | 000003A7 | 00007C1C |
| 2 | 1.06250 | 1.09375 | 00000371 | 00007875 |
| 3 | 1.09375 | 1.12500 | 00000340 | 00007504 |
| 4 | 1.12500 | 1.15625 | 00000313 | 000071C4 |
| 5 | 1.15625 | 1.18750 | 000002EA | 00006EB1 |
| 6 | 1.18750 | 1.21875 | 000002C4 | 00006BC8 |
| 7 | 1.21875 | 1.25000 | 000002A0 | 00006904 |
| 8 | 1.25000 | 1.28125 | 0000027F | 00006664 |
| 9 | 1.28125 | 1.31250 | 00000261 | 000063E5 |
| 10 | 1.31250 | 1.34375 | 00000245 | 00006184 |
| 11 | 1.34375 | 1.37500 | 0000022A | 00005F40 |
| 12 | 1.37500 | 1.40625 | 00000212 | 00005D16 |
| 13 | 1.40625 | 1.43750 | 000001FB | 00005B04 |
| 14 | 1.43750 | 1.46875 | 000001E5 | 0000590A |
| 15 | 1.46875 | 1.50000 | 000001D1 | 00005725 |
| 16 | 1.50000 | 1.53125 | 000001BE | 00005554 |
| 17 | 1.53125 | 1.56250 | 000001AC | 00005396 |
| 18 | 1.56250 | 1.59373 | 0000019B | 000051EB |
| 19 | 1.59375 | 1.62500 | 0000018B | 0000504F |
| 20 | 1.62500 | 1.65625 | 0000017C | 00004EC4 |
| 21 | 1.65625 | 1.68750 | 0000016E | 00004D48 |
| 22 | 1.68750 | 1.71875 | 0000015B | 00004BD9 |
| 23 | 1.71875 | 1.75000 | 0000015B | 00004A78 |
| 24 | 1.75000 | 1.78125 | 00000143 | 00004924 |
| 25 | 1.78125 | 1.81250 | 00000143 | 000047DB |
| 26 | 1.81250 | 1.84375 | 0000012D | 0000469C |
| 27 | 1.84375 | 1.87500 | 0000012D | 0000456F |
| 28 | 1.87500 | 1.90625 | 0000011A | 00004442 |
| 29 | 1.90625 | 1.93750 | 0000011A | 00004328 |
| 30 | 1.93750 | 1.96875 | 00000108 | 0000420E |
| 31 | 1.96875 | 2.00000 | 00000108 | 00004106 |

As an example, let the fraction bits of x be numbered x(1:52) for a double-precision IEEE floating point number, bit 1 being the most significant bit, just to the right of the implied bit 1. Bits x(1:5) are used to address the table, and $x_L$ is equal to x(6:14) which are used to multiply the value a read from the table. If the multiplier uses a modified Booth recoder to reduce the number of levels of carry-save-adders, then the Booth recoding can be done in parallel with the table access, thus reducing the effective delay of the multiplier. The multiplier produces a product of 19 bits, but only the most significant 10 bits are subtracted from b". These bits would be aligned with the lower 10 bits of b". For the above example, if p(1:19) is the 19-bit intermediate product of a and $x_L$, then the following subtraction is used to obtain y:

$$y=0.b''(1:15)-0.00000p_1p_2p_3p_4p_5p_6p_7p_8p_9p_{10}$$

Appropriate logic circuits can be provided within the processor to implement the foregoing as will become apparent to those skilled in the art. To verify the algorithm, a program was written to test all possible values of the mantissa, and the results for all values were within the desired precision. In Table 1 the constants in the slope column starting with interval 26 are duplicated. This simplification is a result of being able to use an interval of ⅟16 for 1.78125≦x<2 while still meeting the precision requirement.

The precision required for the reciprocal estimate determines both the number of table entries and the number of bits in the values stored. The definition of precision used here is similar to that used in the PowerPC™ architecture. Twelve bit precision is defined as a relative error less than $½^{12}=1/4096$, i.e., $$\text{ABS}\left(\frac{\text{estimate}-1/x}{1/x}\right) \leq 1/4096$$

The algorithm presented in this disclosure meets this requirement and, in addition, is more generally useful because it can be used as the basis for a fast division algorithm. The method reduces both the size and the delay of the multiplier. When combined with one Newton-Raphson iteration the 12-bit precision version of the algorithm provides nearly a single-precision IEEE-compatible reciprocal with two additional passes through the multiply-add pipeline. If a double-precision reciprocal is required, a straight forward extension of the algorithm to provide 14-bit precision would be advantageous. A double-precision reciprocal would then require two Newton-Raphson iterations or four passes through the multiply-add pipeline.

In general a significant improvement in the time required to compute the reciprocal of a number for a relatively minor increase in cost is possible with this algorithm. As noted in the Description of Related Art, to generate 12 correct bits with a conventional table lookup technique would require a table of 2048 entries. The technique described herein trades the 2048 entry table for a 15-bit adder, a 10-bit by 9-bit multiplication, and a table requiring fewer than 32 unique pairs of entries. Of the table entry pairs, one of the numbers requires a maximum of 15 bits, the other a maximum of 10 bits, and both are fixed point. Thus the algorithm significantly reduces hardware and provides comparable performance.

Figure 4:
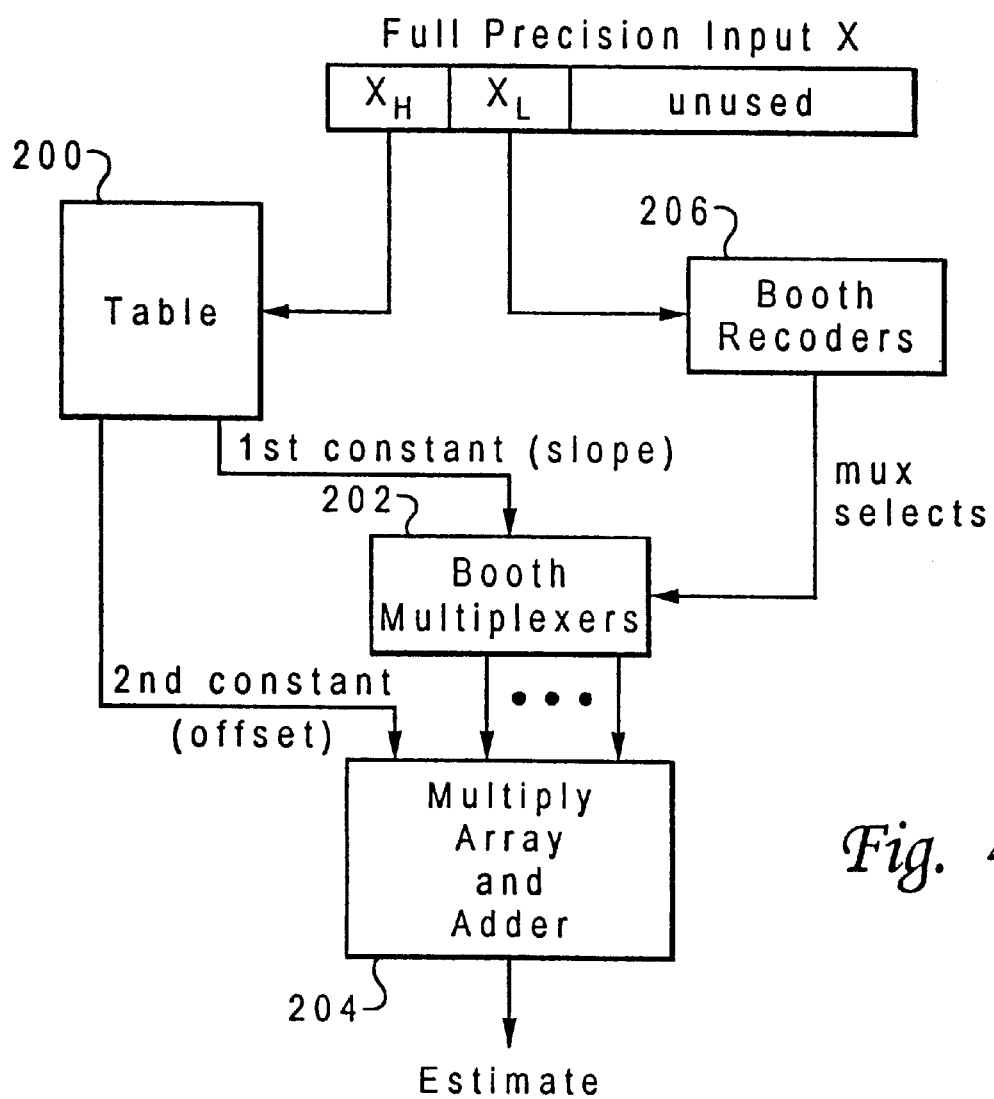
FIG. 4 is a block diagram of one embodiment of the invention.

FIG. 4 illustrates one method of implementing the present invention. A full precision input x is partitioned into a higher order part $x_H$ and a lower order part $x_L$. The higher order part is fed to the lookup table 200, which provides the first constant (slope) to a Booth multiplexer 202, and also provides the second constant (offset) to a multiply array and adder 204. The lower order part is used as an input to a Booth recoder 206 which acts as the mux select for Booth multiplexer 202.

Figure 5:
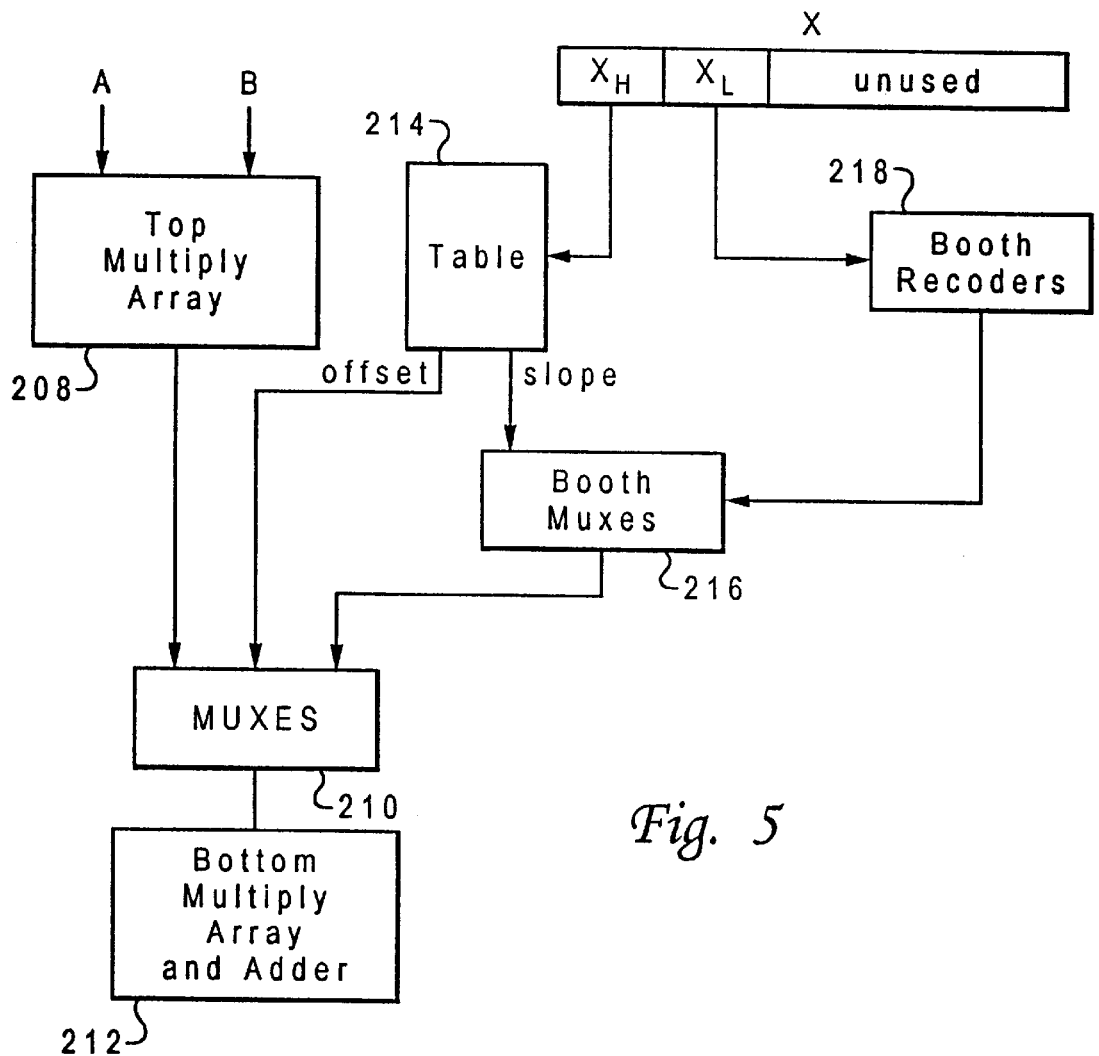
FIG. 5 is a block diagram of another embodiment of the invention which shares some of the circuits of the multiplier in a conventional floating-point unit.

FIG. 5 illustrates an alternative implementation of the present invention which utilizes certain circuits of the multiplier in a conventional floating-point unit which includes a top multiply array 208, a multiplexer 210, and a bottom multiply array and adder 212. The high order part of the input value is again fed to a lookup table 214. Table 214 again provides the first constant (slope) to a Booth multiplexer 216 but, in this implementation, the second constant (offset) is fed to multiplexer 210. The lower order part of the input value is still fed to a Booth recoder 218 which acts as the mux select for Booth multiplexer 216.

According to a second implementation of the present invention, and again with reference to FIG. 3, the graph may now be considered as a segment of the reciprocal square root function y=1/√x. It is still assumed that y and x are normalized numbers, and that now $0.5 \leq x < 2$. As stated above, it is well known how to handle the floating-point exponent, so without loss of generality only generation of the mantissa is discussed herein. In FIG. 3 the curve A-B represents a segment of the function $y=1/\sqrt{x}$. Between the points $x_1$ and $x_2$, the line C-D approximates $1/\sqrt{x}$. The slope, a, of line C-D is given by the equation $$a=(y_2-y_1)/(x_2-x_1)=(1/x\sqrt{_2}-1/\sqrt{x_1})/(x_2-x_1)$$

The offset, b, is given by the equation $$b=y_1-ax_1$$

The maximum relative error, $y_{err}$ occurs at $x_{max}$ which can be found by differentiating $$y_{err} = \frac{ax_{max} + b - 1/\sqrt{x_{max}}}{1/\sqrt{x_{max}}}$$

and setting $$\frac{dy_{err}}{dx} = 0$$

$$x_{max} = -b/(3a)$$

Again, while the worst case error occurs at $x_{max}$, the error at the end points is zero, and the error can be spread over the interval and the maximum error reduced by approximately a factor of two by "sliding" the line C-D half-way down to the curve A-B at the point $x_{max}$. This puts the line in the position shown by E-F in FIG. 3. The slope of E-F remains a. The offset of E-F, b', is given by $$b'=b-0.5(ax_{max}+b-1/\sqrt{x_{max}})$$

The method of the present invention again provides a linear approximation based on the constants a and b'. An examination of the functions $1/\sqrt{x}$ and ax+b similarly reveals that the slope, a, will always be negative. For convenience, in the development that follows a is treated as positive, and then ax is subtracted from b'.

The constants a and b' can be stored in lookup tables for different intervals between 0.5 and 2. The particular constant pair is chosen by the most significant mantissa bits of the argument x. The size of the interval is the largest power of two that permits the error criteria to be met. For a relative error less than $\frac{1}{2}^{12}$, the interval size is $\frac{1}{32}$ for the range $0.5 \leq x < 1$, and is $\frac{1}{16}$ for the range $1 \leq x < 2$. The change in interval size makes it convenient to consider two tables, each with 16 pairs of entries. The first table is used for arguments $0.5 \leq x < 1$, and the second table is used for arguments $1.0 \leq x < 2$. The reciprocal square root is computed by selecting the appropriate table based on the least significant bit of the exponent. The appropriate entry in a given table is then selected by ignoring the implied bit and using the most significant j bits of the mantissa to select the appropriate constants a and b' from the stored table. If the accuracy criteria is a relative error less than $\frac{1}{2}^{12}$, j=4. Then, the estimated reciprocal square root y is computed as ax+b'.

Considering the precision requirement, truncation, and round-off errors, the computation y=b'-ax implies a 15-bit multiply and add. However, the multiplication can be reduced to 10 bits by again recognizing that, for the constant pair selected the first four bits of x and the appropriate table are already known. For one particular hardware embodiment, the argument x can similarly be partitioned into a high order part $x_H$ and a low order part $x_L$. Part $x_H$ consists of the table select bit and the j bits used to address the table. The product of a and $x_H$ can be calculated, subtracted from b', and stored when the table is created. Thus, for each interval of x, the equation y=b'-ax can be rewritten as:

$$y=b'-a(x_H+x_L)=(b-ax_H)-ax_L=b''-ax_L$$

Referring to FIG. 3, b" is the value of $y_1$ on the line E-F. The constant a used to multiply $x_L$ can have j fewer bits than b" because $x_L$ is a factor of $2^j$ smaller than b" in magnitude. In a preferred embodiment, the actual constants stored in the tables are again rounded versions of a and b". The constant b" requires 16 bits to provide 12 bits of precision when considering real round-off and truncation errors. Because rounding $x_L$ would increase execution time, $x_L$ is truncated. In an exemplary implementation, the slope a is multiplied by $x_L$ where $x_L$ consists of the 10 most significant bits of x following the four fraction bits used to access the table. Table 2 below is used for arguments $0.5 \leq x < 1$. Table 3 is used for arguments $1.0 \leq x < 2$. The constants are presented in hexadecimal form.

TABLE 2

| Interval | Left Edge | Right Edge | Slope (a) | Modified Offset (b") |
|---|---|---|---|---|
| 0 | .50000 | .53125 | 00000568 | 0000B4FD |
| 1 | .53125 | .56250 | 000004F3 | 0000AF97 |
| 2 | .56250 | .59357 | 0000048D | 0000AAA5 |
| 3 | .59357 | .62500 | 00000435 | 0000A1E4 |
| 4 | .63500 | .65625 | 000003E7 | 0000A1E4 |
| 5 | .65625 | .68750 | 000003A2 | 00009DFE |
| 6 | .68750 | .71875 | 00000365 | 00009A5C |
| 7 | .71875 | .75000 | 0000032E | 000096F8 |
| 8 | .75000 | .78125 | 000002FC | 000093CA |
| 9 | .78125 | .81250 | 000002D0 | 000090CE |
| 10 | .81250 | .84375 | 000002A8 | 00008DFE |
| 11 | .84375 | .87500 | 00000283 | 00008B57 |
| 12 | .87500 | .90625 | 00000261 | 000088D4 |
| 13 | .90625 | .93750 | 00000243 | 00008673 |
| 14 | .93750 | .96875 | 00000226 | 00008431 |
| 15 | .96875 | 1.00000 | 0000020B | 0000820B |

Modified slope and offset values to be implemented $0.5 \leq x < 1.0$.

TABLE 3

| Interval | Left Edge | Right Edge | Slope | Modified Offset |
|---|---|---|---|---|
| 0 | 1.00000 | 1.06250 | 000003D2 | 00007FFA |
| 1 | 1.06250 | 1.12500 | 00000380 | 00007C29 |
| 2 | 1.12500 | 1.18750 | 00000338 | 000078AA |
| 3 | 1.18750 | 1.25000 | 000002F9 | 00007572 |
| 4 | 1.25000 | 1.31250 | 000002C2 | 00007279 |
| 5 | 1.31250 | 1.37500 | 00000292 | 00006FB7 |
| 6 | 1.37500 | 1.43750 | 00000266 | 00006D26 |
| 7 | 1.43750 | 1.50000 | 0000023F | 00006AC0 |
| 8 | 1.50000 | 1.56250 | 0000021D | 00006881 |
| 9 | 1.56250 | 1.62500 | 000001FD | 00006665 |
| 10 | 1.62500 | 1.68750 | 000001E1 | 00006468 |
| 11 | 1.68750 | 1.75000 | 000001C7 | 00006287 |
| 12 | 1.75000 | 1.81250 | 000001AF | 000060C1 |
| 13 | 1.81250 | 1.87500 | 90000199 | 00005F12 |
| 14 | 1.87500 | 1.93750 | 00000185 | 00005D79 |
| 15 | 1.93750 | 2.00000 | 00000173 | 00005BF4 |

Modified slope and offset values to be implemented $1.0 \leq x < 2.0$.

As an example, let the fraction bits of x again be numbered x(1:52) for a double-precision IEEE floating point number, bit 1 being the most significant bit, just to the right of the implied bit 1. The least significant bit of the exponent is used to select the table, bits x(1:4) are used to address the table, and $x_L$ is equal to x(5:14) which are used to multiply the value a read from the table. If the multiplier uses a modified Booth recoder to reduce the number of levels of carry-save-adders, then the Booth recording can similarly be done in parallel with the table access, thus reducing the effective delay of the multiplier. The multiplier produces a product of 20 bits, but only the most significant 11 bits are subtracted from b". These bits would be aligned with the lower 11 bits of b". For the above example, if p(1:20) is the 20-bit intermediate product of a and $x_L$, then the following subtraction is used to obtain y:

$$y=b"(0).b"(1:15)-0.0000p_1p_2p_3p_4p_5p_6p_7p_8p_9p_{10}p_{11}$$

where b"(0)=1 for $0.5 \leq x < 1.0$, and b"(0)=0 for $1.0 \leq x < 2.0$. Appropriate logic circuits can again be provided within the processor to implement the foregoing as will become apparent to those skilled in the art. To verify the algorithm, a program was written to test all possible values of the mantissa, and the results for all values were within the desired precision.

The algorithm for the reciprocal square root presented in this disclosure again meets the twelve-bit precision requirement and reduces both the size and the delay of the multiplier. When combined with one Newton-Raphson iteration it provides a nearly full single-precision IEEE-compatible square root with three additional passes through the multiply-add pipeline. If a double-precision reciprocal square root is required, a straight forward extension of the algorithm to provide 14-bit precision would be advantageous. A double-precision reciprocal square root would then require two Newton-Raphson iterations or six passes through the multiply-add pipeline.

In general a significant improvement in the time required to compute the reciprocal square root of a number for a relatively minor increase in cost is again possible with this algorithm. The technique described herein trades the 2048 entry table for a 16-bit adder, a 11-bit by 10-bit multiplication, and a table requiring 32 unique pairs of entries. Of the table entry pairs, one of the numbers requires a maximum of 16 bits, the other a maximum of 11 bits, and both are fixed point. Thus the algorithm similarly reduces hardware and provides comparable performance. FIGS. 4 and 5 can be used in a manner similar to that described above to implement the invention for the reciprocal square root function.

The square root function can be provided several different ways. One way, as described earlier, is to provide the reciprocal square root of an argument, and then multiply that value by the argument to obtain its square root. Another way is to use tables that provide the square root directly. The method just described for providing the reciprocal square root, using two tables, should also provide the square root function by using appropriate values in the two tables, with one slight modification. For the square root function, the product of the lower order part of the mantissa of the input and the first constant must be added to the second constant rather than be subtracted from it. Furthermore, there are other elementary functions, such as the square of a number and some transcendental functions, which can also be provided with the help of this invention.

It is also likely that both the reciprocal and the reciprocal square root functions will be needed in the same system. It is not necessary to provide separate hardware for them. The table can be expanded to include all functions that are needed using this invention, so that the other hardware shown in FIGS. 4 and 5, such as the Booth recoders, the multiplexers, the multiply arrays, and the adder, can all be shared by the various functions.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, while the present invention is particularly useful in large scale computer systems such as that depicted, it is equally applicable to smaller, limited-purpose computer systems, such as hand-held calculators. It is therefore contemplated that such modifications can be made without departing from the spirit or scope of the present invention as defined in the appended claims.

What is claimed is:

1. A method of estimating an elementary function having a non-linear portion, using a computer system having a processor, comprising the steps of:

normalizing an input value to yield a normalized input value;

selecting a first constant and a second constant from a table having a plurality of intervals, based on the normalized input value, wherein the first and second constants are based on a linear approximation of the non-linear portion of the elementary function using left and right edges of a given interval, offset to reduce a maximum error value for the given interval; and calculating an estimated output value using the normalized input value, the first constant, and the second constant in a multiply-add operation of the processor, wherein said selecting step further reduces the number of bits required in the multiply-add operation.

2. A processor for a computer system, comprising:

a plurality of registers;

a plurality of logic units connected to said registers, including a floating-point execution unit allowing multiply-add operations; and a table lookup for providing an estimate of an elementary function having a non-linear portion based in a normalized input value residing in one of said registers, said table lookup having a plurality of intervals and associated pairs of first and second constants used as inputs to said floating-point execution unit, said first and second constants being based on a linear approximation of the non-linear portion of the elementary function using left and right edges of a given interval, offset to reduce a maximum error value for the given interval, and selected to reduce the number of bits required in a multiply-add operation which calculates an estimated output value.

* * * * *

UNITED STATES PATENT AND TRADEMARK OFFICE
CERTIFICATE OF CORRECTION

PATENT NO. : 6,240,433 B1
DATED : May 29, 2001
INVENTOR(S) : Schmookler et al.

Page 1 of 1

It is certified that error appears in the above-identified patent and that said Letters Patent is hereby corrected as shown below:

<u>Column 7,</u>
Line 4, please add "=" before "b"

Signed and Sealed this

Nineteenth Day of March, 2002

Attest:

Attesting Officer

JAMES E. ROGAN
*Director of the United States Patent and Trademark Office*